July 11, 1967　　　R. H. FOSTER ETAL　　　3,330,457
TOTAL TENSION MONITOR AND CONTROL SYSTEM
Filed Feb. 11, 1965　　　　　　　　　　　　4 Sheets-Sheet 1

INVENTORS
RAYMOND H. FOSTER
GEORGE P. KNAPP
BY Kenway, Jenney & Hildreth
ATTORNEYS

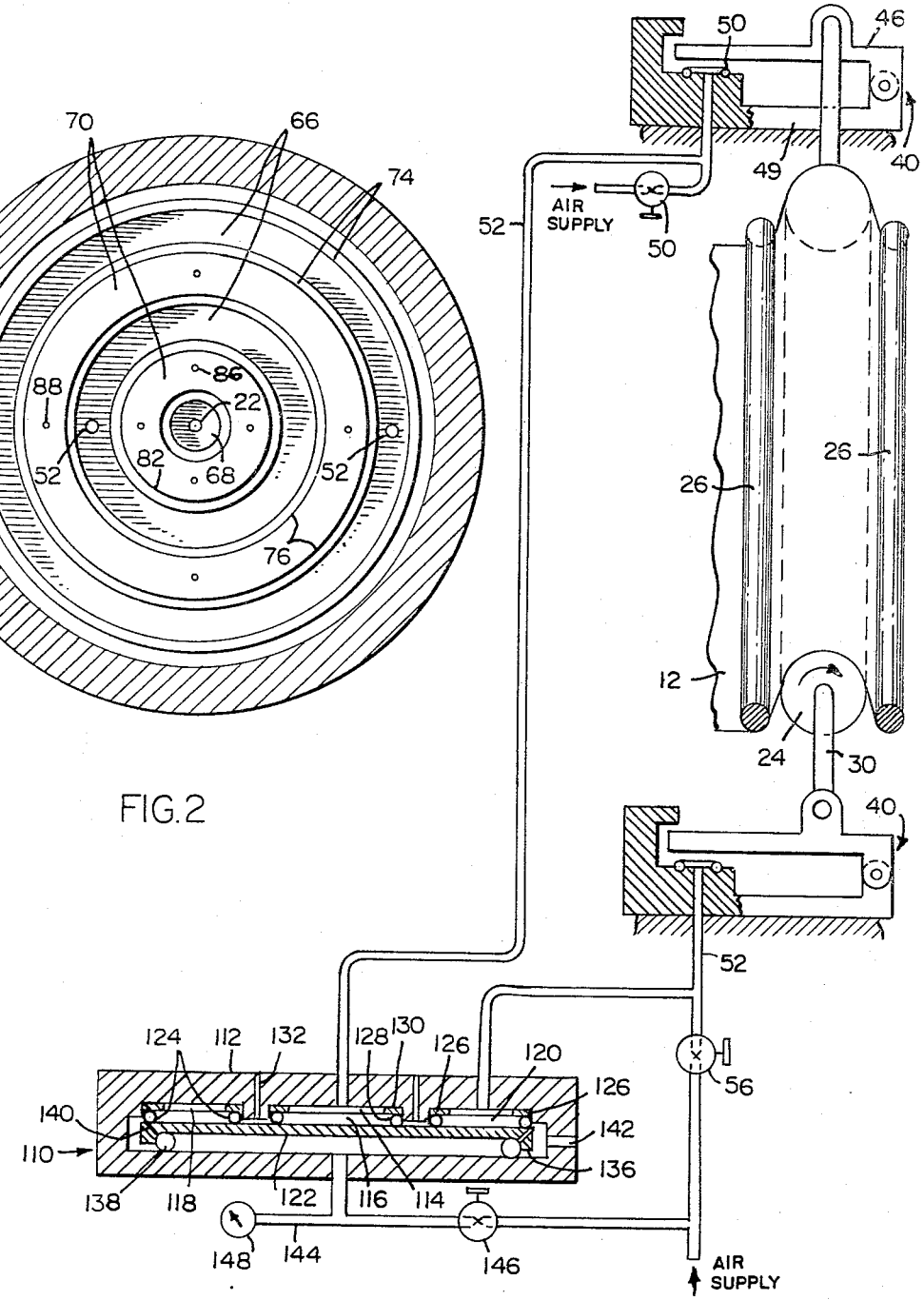

July 11, 1967  R. H. FOSTER ETAL  3,330,457
TOTAL TENSION MONITOR AND CONTROL SYSTEM
Filed Feb. 11, 1965  4 Sheets-Sheet 3
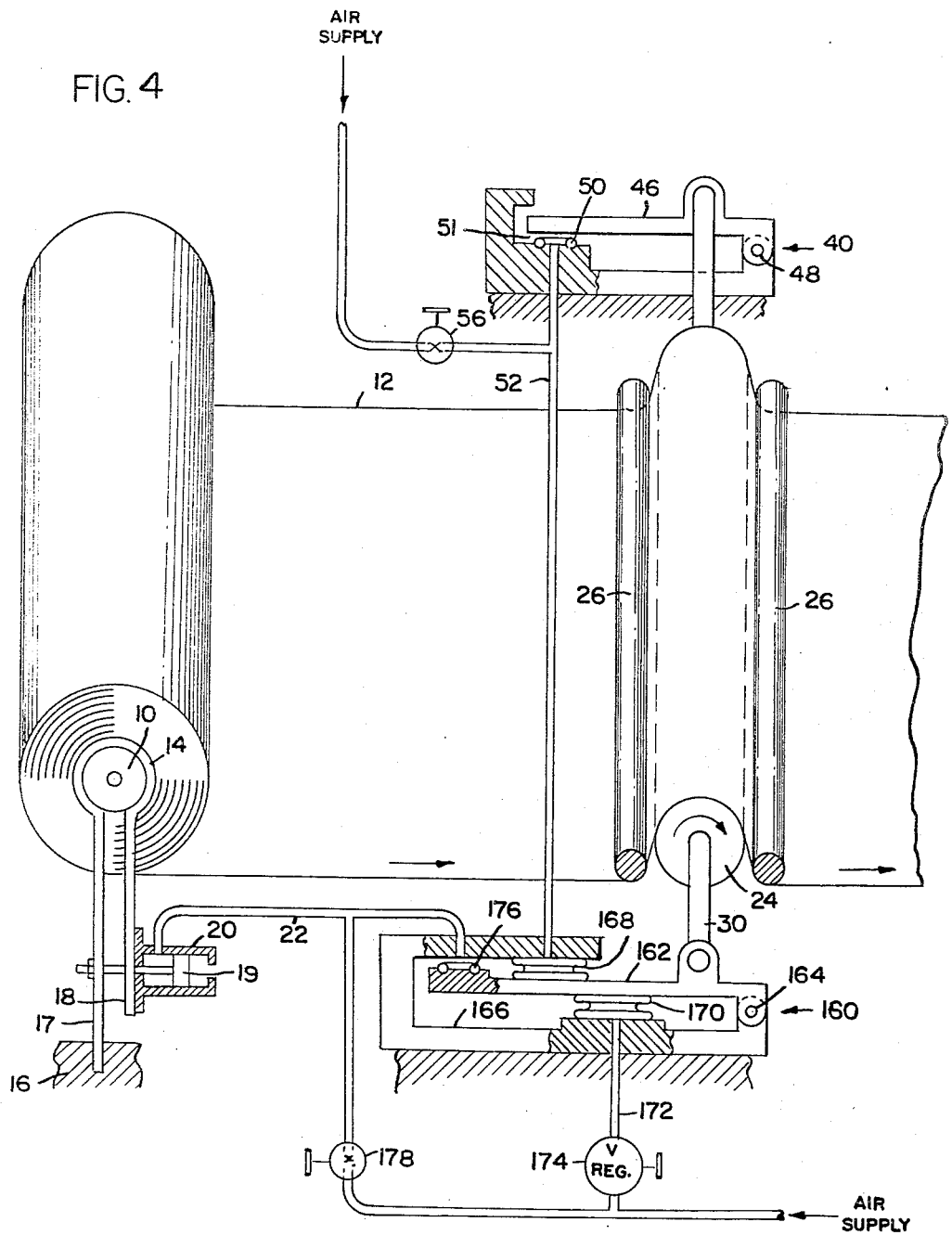
INVENTORS
RAYMOND H. FOSTER
GEORGE P. KNAPP
BY Kenway Jenney & Hildreth
ATTORNEYS July 11, 1967 R. H. FOSTER ET AL 3,330,457
TOTAL TENSION MONITOR AND CONTROL SYSTEM
Filed Feb. 11, 1965 4 Sheets-Sheet 4

INVENTORS
RAYMOND H. FOSTER
GEORGE P. KNAPP

BY Kenway, Jenney & Hildreth

ATTORNEYS

United States Patent Office 3,330,457
Patented July 11, 1967

3,330,457
TOTAL TENSION MONITOR AND CONTROL SYSTEM
Raymond H. Foster, Norton, and George P. Knapp, Waban, Mass., assignors to Mount Hope Machinery Company, Taunton, Mass., a corporation of Massachusetts
Filed Feb. 11, 1965, Ser. No. 431,920
4 Claims. (Cl. 226—44)

ABSTRACT OF THE DISCLOSURE

A tension monitor and control system which is responsive to the summation of tension forces across the full width of a traveling sheet. One end of a dancer roll applies sheet tension force signal directly to a summing valve, the other end to a force-balancing valve which transmits a tension signal pressure to the summing valve. The two signals are added and balanced against a regulated pressure by a movable summing valve member, whose position controls a pressure-bleed orifice to establish a tension-controlling output signal pressure. Also, a summing valve construction having concentric annular expansible chambers for summing the tension signal pressures and balancing against a regulated pressure.

This invention relates to an improved continuous tension monitor and control system, for use with mechanisms for feeding sheet or web materials, and finds particular utility in various commercial processes in which it is desired to control accurately the longitudinal tension in a moving sheet or web of indefinite length.

By way of background to the present invention, reference may be taken to a control system described and claimed by U.S. Patent No. 3,164,333 to John D. Robertson, issued Jan. 5, 1965 and entitled "Tension Control System for Web-Feeding Mechanisms" which is assigned to the assignee of the present application. According to the aforesaid application, the tension existing in a traveling sheet or web is detected by means of a dancer roll which is supported in a spherical bearing at one end, and bears upon a force-balancing valve unit at the other end. A force related to the variable sheet tension is thus applied against the valve, and is balanced by a pressure-support cylinder supplied with a fluid under a regulated pressure. The position of the valve thus reflects the relationship between the existing tension and the desired tension, the latter being determined by the pressure selected. The position of the valve controls the area of a fluid-release orifice, which is supplied with pressure fluid at a limited rate: and the area of this orifice in turn controls the pressure in its supply conduit, which is an output pressure signal. This signal pressure is proportionate to the difference between that tension value which would balance the regulated pressure in the supported cylinder, and the tension actually existing in the web. The system thus far described constitutes a tension monitor which produces a signal related to the tension level; it can be incorporated in a tension control system by using the signal pressure to actuate sheet tension control means, such as a fluid-actuated brake. The system may be such as to control the web tension as a continuous function, or may be so equipped as to become operative only when the web tension varies in excess of tolerance limits.

However, the foregoing system is subject to inaccuracy in the event that the tension is not uniform as between the various longitudinal elements located across the width of the sheet. This difficulty arises because the force applied by the valve-supported end of the dancer roll to the valve member is affected by the unequal lever arms of the individual longitudinal elements; the values of tension existing at different points across the width of the sheet are therefore unequally represented in the net tension force applied to the valve member. Furthermore, if the sheet shifts laterally on the roll, which is normally a continual occurrence, the net effective lever arm is altered, and a change in the tension component applied to the valve member results even though the actual sheet tension remains the same.

It is the primary object of the present invention to improve the accuracy of tension detection and control; and to provide an improved tension monitor and control system whose response is not affected by inequalities in local tension across the width of a sheet, or by a bodily lateral displacement of the entire sheet. The invention is specifically concerned with a monitor, and a control system incorporating the monitor, which is responsive to the total longitudinal tension existing in a traveling sheet or web; that is to say, a system which is equally responsive to the local tension in each longitudinal element of the sheet, regardless of its lateral location within the sheet, and regardless of random lateral movements of the sheet as a whole.

Briefly stated, according to preferred embodiments thereof, the invention may be carried out by wrapping the traveling sheet or web about a dancer roll so as to impart a vector component of the total sheet tension to the roll; and by supporting the opposite ends of the dancer roll in first and second means for transmitting components of the applied tension force from each end of the roll and applying them to a summing device. The summing device includes a movable summing valve member, to which the separately-transmitted tension forces are applied additively. This applied total tension force is balanced by means which produce a fluid pressure reaction force biasing the summing valve member in a sense opposite to that of the tension forces. In alternate forms, the pressure reaction means comprise a variable area fluid-release orifice or a closed pressure support cylinder.

When a support cylinder is employed, a pre-selected regulated fluid pressure serves as a reference tension value. The position of the summing valve member then reflects the relationship between the total tension of the web and a pre-selected tension value, the latter being represented by the regulated pressure applied to the support cylinder. This displacement is used to establish a controlling pressure signal by means of a fluid-release orifice, whose area is varied by the summing valve member; and a conduit is arranged to supply this orifice with pressure fluid at a limited rate of flow. The pressure signal within the conduit is a function of the opening of the fluid release orifice, and therefore of the difference between the pre-selected and the actual values of tension. The signal is applied to pressure-actuated sheet tension control means, such as a pneumatic brake arranged to act on an unwinding reel. A desired tension level can then be established by selecting the pressure of the fluid supply to the pressure support cylinder.

In an alternate form, the summing device is modified by omitting the pressure support cylinder; and by utilizing the fluid-release orifice not only to produce the tension indicating pressure signal, but also to perform the function of balancing the applied tension forces, through the reaction of escaping fluid on the surface of the summing valve member.

The tension-transmitting means previously mentioned may assume several different forms. One end of the axle of the dancer roll may apply its tension force component directly to the summing valve member; and the other may be supported by a tension monitor valve, which is preferably of a type described and claimed in a copending application held by the same assignee, Ser. No. 271,230, now Patent No. 3,240,058, filed Apr. 8, 1963 by Raymond H. Foster for "Continuous Tension Monitor for Web Feeding Mechanisms." This device establishes a pressure signal which reflects the value of the tension force component applied to the monitor valve; this signal is delivered to a pressure bias cylinder which transmits the force component to the summing valve member. In another embodiment, a pair of signal-producing tension monitor valves support the opposite ends of the dancer roll, and separate pressure bias cylinders apply the tension force components additively to the summing valve member.

While the specification concludes with claims particularly pointing out the subject matter which we regard as our invention, it is believed that a clearer understanding may be gained from the following detailed description of preferred embodiments thereof, referring to the accompanying drawings, in which:

FIG. 2 is a sectional view taken along line 2—2 in FIG. 1;

FIG. 3 is a schematic view showing an embodiment of the invention in a tension monitor;

FIG. 4 is a schematic view showing another embodiment of the invention in a tension control system;

Figure 1:
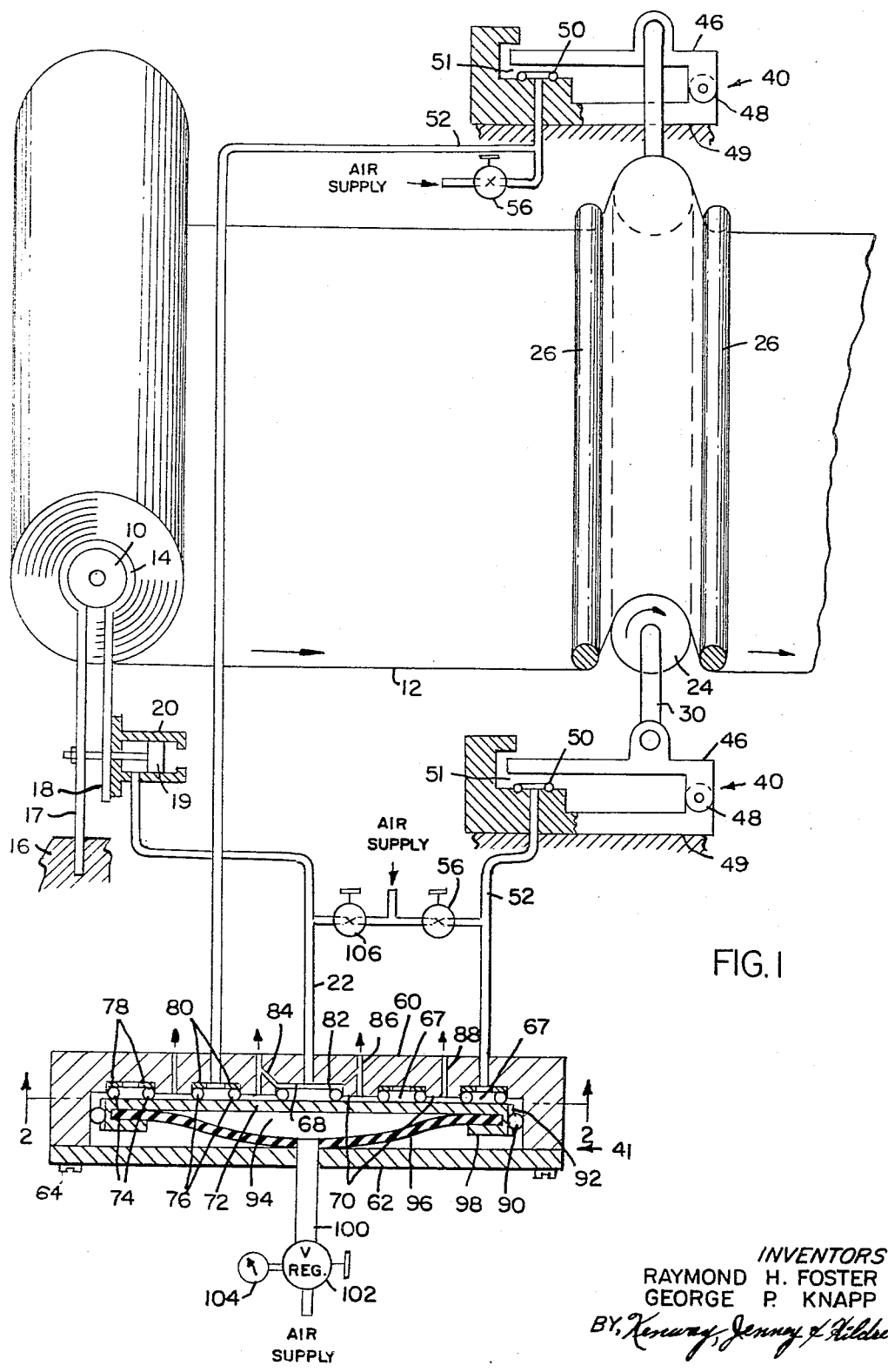
FIG. 1 is a schematic view showing a first embodiment of the improved tension control system in operative relation to a portion of a sheet-feeding mechanism.

Referring to FIGS. 1 and 2, a first form of the improved tension control system is shown in operative relation to an illustrative web-feeding device. This device includes a supply reel 10 carrying a roll of sheet or web material 12, and journalled in suitable bearings (not shown) for feeding the sheet to a take-up reel, or other device for drawing the sheet in the direction shown by the arrow. The supply reel 10 is provided with a suitable brake for exerting a variable braking torque to regulate the web tension. The illustrated brake 14 comprises a split ring having an arm 17 mounted in a stationary support 16 and affixed to the piston 19 of a fluid motor 20. A free arm 18 is affixed to the cylinder of the fluid motor, which is connected for actuation by pressure supplied through a branched conduit 22, to adjust the compression of the brake and thus vary the braking torque applied to the reel 10.

A dancer roll 24 is wrapped by the moving sheet intermediate a pair of idler rolls 26, the wrap being such as to impart a vector component of the total sheet tension to the dancer roll, which acts vertically downwardly in the schematic drawings. The ends of the axle 30 are mounted on separate tension transmitters, which in this embodiment comprise force-balancing monitor valve units 40. It is the function of the monitor valves to detect the total tension in the web, as applied by the ends of the axle 30, and to transmit the tension force components additively to a summing device generally indicated at 41.

Because the dancer roll is entirely supported by the monitor valves, the moment arms of individual longitudinal elements of the sheet relative to the axle supports, are inherently corrected for in the summed tension components delivered to the summing device. Therefore, variations in longitudinal tension at different points across the width of the sheet, or even a lateral shift of the entire sheet, cannot introduce artificial errors.

In the illustrated system, the monitor valves 40 are of a type described and claimed in the aforementioned copending application No. 271,230, now Patent No. 3,240,058. Each unit includes a movable valve member 46, pivotally supported at 48 on a stationary base plate 49, for cooperation with a resilient O-ring 50 to form a variable fluid-release orifice 51. These orifices are supplied with compressed air at a limited rate of flow by means of separate branched conduits 52, each of which has a flow restriction, formed by an adjustable needle valve 56, to limit the flow rate. The conduits 52 terminate in the upper surfaces of the base plates and interiorly of the O-rings 50, so that the relative position of each valve member 46 regulates the release of air through the corresponding orifice.

Either end of the axle 30 of the dancer roll is supported on one of the valve members 46, so that the total tension vector acts in a direction tending to close both of the orifices 51. The reaction of the escaping gas against the lower surfaces of the valve members 46 is a function of the areas of the orifices; by setting the needle valves 56 to balance the load, and to give an adequate range of pressure variation response over the expected range of tension to be encountered in a run, the valves will be retained slightly open and in a balanced condition.

The pressure existing in the conduits 52 reflects the applied tension force components; these components are added by the summing device 41. This device is contained in a casing 60, enclosed by a cover 62 removably secured by screws 64. The interior of the casing is recessed to form a pair of annular grooves 66 (FIG. 2) and a central circular recess 68, these areas being separated by annular lands 70. The areas 66 define pressure bias cylinders 67, for transmitting the tension signal pressures from the conduits 52 to act additively on a summing valve member 72. In the general case, the areas defined by the grooves 66 are equal, so that equivalent pressures in the two conduits 52 will act with equivalent forces on the summing valve member. The bias cylinders 67 are sealed by two pairs of O-rings 74, 76, which are slidable within the grooves 66 and are biased into pressure engagement with the upper surface of the valve member 72 by means of two pairs of annular spring washers 78, 80.

A central circular recess 68 forms a variable-area fluid-release orifice in cooperation with an O-ring 82, which is slidable freely in the recess and rests upon the summing valve member 72. The O-ring controls the escape of gas from the conduit 22 through a series of circumferentially-spaced ports 84, according to the position of the summing valve member. The air bleed is completed through a series of circumferentially-spaced holes 86, which also communicate with one of the lands 70 to relieve the compression of entrapped air. A further circumferential row of relief ports 88 communicates with the outer land 70 for the same purpose. The summing valve member 72 is freely movable within the casing 60, being guided vertically by a series of circumferentially-spaced balls 90 which are slidably received in grooves 92 formed about the valve member.

The tension force components additively applied to the summing valve member are balanced by means of a pressure support cylinder or expansible chamber 94, which is formed between a flexible diaphragm 96 of rubber or the like, and the lower surface of the valve member. For sealing this chamber, it is sufficient to dispose the diaphragm within a circumferential flange 98 formed about the periphery of the valve member, as the pressure within the chamber maintains the seal. A fluid pressure sufficient to balance the applied tension force is supplied by a conduit 100, having an adjustable pressure regulating valve 102 furnished with an indicating gauge 104.

It will be understood that the effective area of the orifices 51 and 84 and of the cylinders 67 and 94 should be selected with consideration given to the anticipated range of sheet tension, so that the pressure supplied to the support cylinder may be regulated to balance the valve member in an open condition.

Air under pressure is supplied to the branched conduit 22 from a suitable source, and flow-restricting means are interposed in the conduit to limit the rate of flow, comprising an adjustable needle valve 106 in the preferred form. The pressure in the conduit 22 is a function of the displacement of the summing valve member 72. Inasmuch as the net forces applied to this valve member act concentrically, the pressure in the conduit 22 multiplied by the area of the recess 68, will be equal to the upward force of the pressure in the support cylinder 94, minus the downward forces produced in the bias cylinders 67 by the pressure signals received from the transmitters 40. Therefore, the pressure in the conduit 22, and consequently the brake torque applied by the actuator 20, will be proportionate to the difference between the desired tension as selected by the regulating valve 102, and the tension actually existing in the web.

In this system, the existing tension cannot be made to exactly equal the desired tension, but the residual error may be made small by minimizing the diameter of the recess 68. On the other hand, the fact that there is a residual error due to the feedback of brake pressure to the summing device, results in a control characteristic which is both relatively rapid acting and smooth and stable in operation.

In use, the valve 102 is adjusted until the pressure indicated by the gauge 104 corresponds to the desired tension. This pressure may be considered to consist of two components: the "tare" pressure required to balance that partial pressure in the bias cylinders 67 which is necessary to balance the transmitter valves 40 against the weight of the dancer roll; and the partial pressure in the bias cylinders occasioned by the tension force components applied to the transmitters. The support cylinder tends to force the summing valve member upwardly, to close the fluid orifices 84 and thus to raise the pressure in the conduit 22. This increases the brake torque and the sheet tension. But the tension increase is reflected by a downward displacement of the transmitter valve members 46, which correspondingly increases the pressure in the bias cylinders 67 and rebalances the summing valve member 72, thereby restoring the tension to the preselected value.

The invention is also applicable to a tension monitor, and a modified form is shown in FIG. 3 for this purpose. The dancer roll 24 and the transmitter valve units 40 are identical with those shown in the foregoing embodiment, and similar parts are similarly numbered. A modified summing device is generally indicated at 110; in this instance, the casing 112 of the device is provided only with a central circular recess 114 defining a first pressure bias cylinder 116, and a concentric annular recess 118 which forms a second pressure bias cylinder 120. Each of these bias cylinders is connected by one of the branch conduits 52 with one of the transmitter valves 40. The areas of the recesses are equal, so that the signal pressures will produce equivalent force reactions upon the summing valve member 122. The bias cylinders are effectively sealed by a double set of O-rings 124 and spring washers 126 in the annular cylinder 120, and by a single O-ring 128 and spring washer 130 in the inner circular cylinder 116. Relief ports 132 are provided in the casing to relieve the area beneath the annular land 134 separating the cylinders.

The summing valve member 122 is formed with a circumferential depending flange 136, which guides an O-ring 138 freely received therein. A series of orifices 140 are formed circumferentially about the valve member for cooperation with the O-ring, to establish a fluid-release orifice whose area is controlled by the position of the valve member. Air escaping from the orifices 140 leaves the casing through a port 142. Pressurized fluid is supplied to the interior of the O-ring 138 by means of a branched conduit 144, which is provided with an adjustable needle valve 146 to limit the rate of flow.

It is the function of the chamber formed by the O-ring and the summing valve member not only to provide a tension-controlled bleed orifice, but also to establish a reaction force against the valve member to balance it against the forces applied by the bias cylinders 116 and 120. Both the pressure in the conduit 144, and the reaction force against the bias cylinders, are controlled by varying the orifice area of the ports 140 as a function of the tension forces additively applied by the bias cylinders. In this unit, the pressure in the conduit 144 is directly proportional to the tension existing in the sheet. A pressure gauge 148, which may be calibrated in terms of tension units, is provided to afford a direct reading of the tension level.

In use, the needle valves 56 and 146 should be preset to give an adequate range of pressure-variation response over the expected range of tension to be encountered in a run, so that with the available air supply the valve members 46, as well as the summing valve member 122, will remain slightly open under the maximum expected tension loading. The needle valves may be set while the reeling mechanism is stationary, and the gauge 148 may be calibrated by measurement of the sheet tension by any conventional means known in the art. During subsequent operation of the sheet-feeding mechanism, the indicated pressure in the conduit 144 affords an accurate indication of the sheet tension on a continuous basis. The tension-indicating pressure developed by this unit may also be used to regulate tension control means, by incorporating the unit in a suitable control system.

The relationship between the summing devices of the systems of FIG. 1 and FIG. 3 may be more clearly appreciated if it is noted that the output pressure signal of the former in the conduit 22, is proportionate to the difference between the desired tension level, which is preselected by the regulated pressure delivered by the valve 102, and the tension actually existing in the sheet; whereas in the system of FIG. 3, the output signal pressure in the conduit 144 is directly proportional to the existing sheet tension.

In FIG. 4, a modified embodiment of the invention in a tension control is shown, in which only one end of the dancer roll axle 30 is supported in a transmitter or force-balancing valve unit 40. The other end of the axle bears directly upon the movable summing valve member 162 of a modified summing device generally indicated at 160. The summing valve member is in this case pivoted at 164 on a base 166, so that the lever arms of each force applied to the valve member must be taken into consideration as constants affecting the design of the apparatus, along with the effective areas of pressure application. The tension force component transmitted by the single valve unit 40 is once again applied to the summing valve member by means of a pressure bias cylinder, which in this case comprises a bellows 168.

The added tension forces applied by the pressure bias cylinder and the directly-supported end of the dancer roll axle are balanced by a pressure support cylinder comprising a bellows 170. Pressure fluid or air under a regulated pressure is supplied by a conduit 172 and an adjustable regulating valve 174. An O-ring 176 carried by the summing valve member controls the escape of fluid from an orifice formed thereby with the branched conduit 22, as in the preceding embodiments. The conduit 22 is supplied with pressure fluid at a limited rate of flow by means of an adjustable needle valve 178.

The operation of this unit is essentially similar to that of the apparatus shown in FIG. 1. Certain constant factors, including the areas of the pressure elements and their lever arms with respect to their pivot points, enter into the relationship. Specifically, if the product of the area and lever arm of the bellows 168 is made equal to the ratio that the lever arm of the axle 30 on the valve member 162 bears to a constant which depends upon the design of the transmitter valve 40, then the signal pressure in the conduit 22 will be equal to a function of the regulated pressure in the conduit 172, minus a function of the sum of the tension force components applied by the dancer roll, with appropriate constants.

Figure 5:
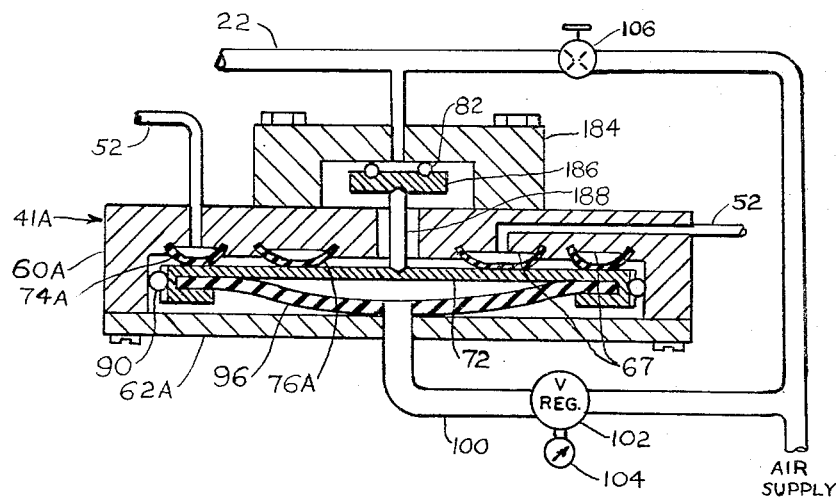
FIG. 5 is a sectional view of an alternative summing device forming one element of the control system.
Figure 6:
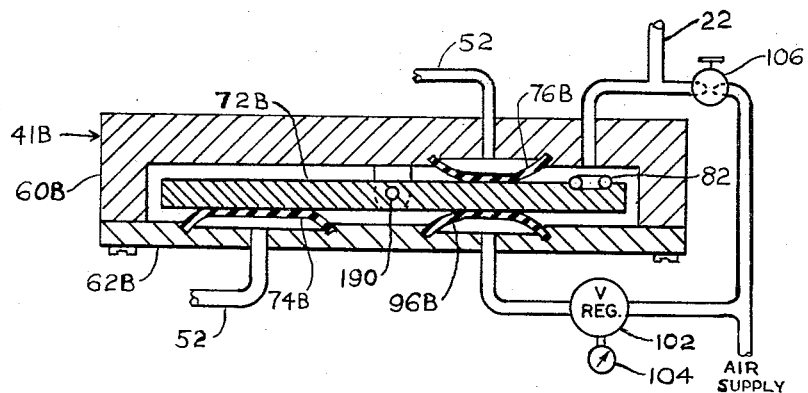
FIG. 6 is a sectional view of another summing device.

Modified summing devices are shown in FIGS. 5 and 6. Either of these may be used in place of the summing device 41 in the tension control system of FIG. 1, and with appropriate modifications that will be apparent to those skilled in the art, may be adapted to replace the summing device 110 in FIG. 3, or the summing device 160 in FIG. 4. In these modified devices, the pressure bias of the monitor valve units 40 is applied to the summing valve member by means of flexible diaphragms, rather than by cylinders defined by O-rings.

In FIG. 5, a summing device 41A has parts similar to those of the embodiment in FIG. 1 similarly numbered. The pressure bias cylinders 67 are formed as annular grooves about the center of the casing 60A. The cylinders are enclosed by means of annular flexible diaphragms 74A and 76A, which are seated in mating inclined recesses formed about the inner and outer peripheries of each groove. The radial dimension of the inner diaphragm 76A is greater than that of the outer diaphragm 74A, so that each will have the same effective area, and will thus exert biases on the summing valve member proportional to the pressures in the two conduits 52. We have found that it is beneficial in this embodiment to isolate the variable-area fluid-release orifice from the valve member 72; this orifice is consequently formed between the O-ring 82 and a separate casing element 184, and the O-ring is carried on a plate 186, to which the movements of the valve member 72 are transmitted by a rod 188. This embodiment is believed to be less subject to any inaccuracy occasioned by intermodulating leakage between the various pressure conduits than the embodiment in FIG. 1.

The summing device 41B in FIG. 6 also utilizes flexible diaphragms for applying the pressure biases to a summing valve member 72B. In this case, however, the valve member is centrally pivoted at 190; and the diaphragms 74B and 76B are circular rather than annular in form. These diaphragms are arranged to apply a clockwise moment about the pivot point, for balancing the regulated counter-clockwise moment applied by a pressure support cylinder formed by a diaphragm 96B.

While we have illustrated and described preferred embodiments of our invention by way of illustration, it will be understood by those skilled in the art that various changes and modifications may be made therein without departing from the true spirit and scope of the invention, which we therefore intend to define in the appended claims without limitation to the details of the foregoing embodiments.

We claim:

1. A total tension control monitor for use with sheet-feeding mechanisms, comprising: a summing device including a movable summing valve member; a dancer roll for wrapping by the sheet to impart a vector component of the total sheet tension thereto; first and second transmitting means supporting the opposite ends of said roll for transmitting components of the applied tension force from each end of said roll to act additively on said summing valve member, said first and second transmitting means including first and second pressure bias cylinder means, respectively, one of said cylinder means being annular and circumferentially spaced about the other; means for applying a fluid pressure reaction force to said summing valve member to balance the latter against said transmitting means; said summing device being formed with a fluid-release orifice valved by said summing valve member, and conduit means for supplying pressure fluid to said fluid-release orifice at a limited rate of flow for control of the pressure in said conduit means by the opening of said fluid-release orifice.

2. A total tension control system for use with sheet-feeding mechanisms, comprising: a dancer roll for wrapping by the sheet to impart a vector component of the total sheet tension thereto; first and second force-balancing valve units each having a movable valve member, said valve members supporting opposite ends of said dancer roll for free movement in the direction of said vector component, each of said valve units being formed with a fluid-release orifice valved by the valve member thereof; separate conduit means for supplying pressure fluid to each of said orifices at a limited rate of flow; said orifices being arranged to apply pressure reaction forces against said valve members to balance the ends of said dancer roll against the applied tension force, whereby the pressure in each of said conduit means is a function of the opening of the corresponding fluid-release orifice; a pressure summing device including a movable summing valve member; first and second pressure bias cylinders each connected with the conduit means of one of said valve units and arranged to bias the valve member of said summing devices additively; a pressure support cylinder and further conduit means for supplying pressure fluid to said support cylinder under a regulated pressure, said support cylinder being arranged to balance the valve member of said summing device against said bias cylinders; said summing device being formed with a further fluid-release orifice valved by the valve member thereof; further conduit means for supplying pressure fluid to said further fluid-release orifice at a limited rate of flow for control of the pressure in said further conduit means by the opening of said further fluid-release orifice; said sheet tension control means being connected for control by the pressure in said further conduit means and being constructed and arranged to maintain said vector component of the total sheet tension substantially at a predetermined mean value dependent upon the regulated pressure in said support cylinder; said first and second pressure bias cylinders, said support cylinder, and said further fluid-release orifice being concentrically arranged with respect to said summing valve member, at least one of said bias cylinders being annular and circumferentially spaced about the other.

3. A total tension control system for use with sheet-feeding mechanisms, comprising: a dancer roll for wrapping by the sheet to impart a vector component of the total sheet tension thereto; a force-balancing valve unit having a movable valve member; a summing device having a movable summing valve member, said valve members supporting opposite ends of said dancer roll for free movement in the direction of said vector component; said valve unit being formed with a fluid-release orifice valved by the valve member thereof; first conduit means for supplying pressure fluid to said orifice at a limited rate of flow, said fluid-release orifice being arranged to apply a pressure reaction force against said valve member to balance the end of said dancer roll supported thereby against the applied tension force, whereby the pressure in said conduit means is a function of the opening of said fluid-release orifice; a pressure bias cylinder connected with said first conduit means and arranged to bias said summing valve member in the same sense as the end of said dancer roll supported by said summing valve member; a pressure support cylinder and second conduit means for supplying pressure fluid to said support cylinder under a regulated pressure, said support cylinder being arranged to balance said summing valve member; said summing device being formed with a further fluid-release orifice valved by said summing valve member; third conduit means for supplying pressure fluid to said further fluid-release orifice at a limited rate of flow for control of the pressure in said third conduit means by the opening of said further fluid-release orifice; and sheet tension control means connected for control by the pressure in said third conduit means and being constructed and arranged to maintain said vector component of the total sheet tension substantially at a predetermined mean value dependent upon the regulated pressure in said support cylinder.

4. A total tension control system for use with sheet-feeding mechanisms, comprising: a dancer roll for wrapping by the sheet to impart a vector component of the total sheet tension thereto; a force-balancing valve unit having a movable valve member, said valve member supporting one end of said dancer roll, said valve unit being constructed and arranged to produce a pressure proportional to the load applied thereto by said one end of said roll; a summing device having a movable summing valve member supporting the second end of said roll; pressure support cylinder means arranged to act against said summing valve member in opposition to the load applied thereto by said second end of the roll; pressure bias cylinder means connected with said force-balanced valve unit to apply said proportional pressure to said summing valve member additively to the load applied by said second end of the roll and in opposition to said pressure support cylinder means; means for supplying pressure fluid to said pressure support cylinder means under a regulated pressure; and conduit means cooperating with said summing valve member to form a variable fluid-release orifice whose area is controlled by the position of said summing valve member; and means for supplying pressure fluid to said fluid-release orifice at a limited rate of flow for control of the pressure in said conduit means in response to the position of said summing valve member.

References Cited

UNITED STATES PATENTS

| | | | |
|---|---|---|---|
| 2,974,894 | 3/1961 | Aaron | 242—75.43 |
| 3,164,333 | 1/1965 | Robertson. | |
| 3,240,058 | 3/1966 | Foster. | |
| 3,289,967 | 12/1966 | Robinson | 242—75.43 |

M. HENSON WOOD, JR., *Primary Examiner.*

J. N. ERLICH, *Assistant Examiner.*